United States Patent
Imai et al.

(10) Patent No.: US 10,618,526 B2
(45) Date of Patent: Apr. 14, 2020

(54) DRIVING ASSISTANCE APPARATUS

(71) Applicant: AISIN SEIKI KABUSHIKI KAISHA, Kariya-shi, Aichiken (JP)

(72) Inventors: Norio Imai, Anjo (JP); Masaya Kato, Susono (JP); Yusuke Kiyokawa, Toyota (JP); Motokatsu Tomozawa, Susono (JP); Yuichi Ukai, Seto (JP)

(73) Assignee: AISIN SEIKI KABUSHIKI KAISHA, Kariya-shi, Aichi-ken (JP)

(*) Notice: Subject to any disclaimer, the term of this patent is extended or adjusted under 35 U.S.C. 154(b) by 0 days.

(21) Appl. No.: 15/899,650

(22) Filed: Feb. 20, 2018

(65) Prior Publication Data

US 2018/0237031 A1 Aug. 23, 2018

(30) Foreign Application Priority Data

Feb. 21, 2017 (JP) .................. 2017-030148

(51) Int. Cl.
*B60W 50/08* (2020.01)
*B60W 10/18* (2012.01)
(Continued)

(52) U.S. Cl.
CPC .......... *B60W 50/082* (2013.01); *B60T 7/042* (2013.01); *B60T 7/085* (2013.01); *B60T 7/22* (2013.01);
(Continued)

(58) Field of Classification Search
CPC .... B60T 2201/022; B60T 7/042; B60T 7/085; B60T 7/22; B60T 8/00; B60T 8/17; B60W 10/18; B60W 10/20; B60W 2050/007; B60W 2050/0095; B60W 2050/146; B60W 2520/04; B60W 2540/12; B60W 2540/18; B60W 2710/18; B60W 2710/20; B60W 30/06; B60W 50/035; B60W 50/082; B60W 50/14; B62D 1/286; G05D 1/0061;
(Continued)

(56) References Cited

U.S. PATENT DOCUMENTS 6,782,960 B2 * 8/2004 Kanzler .................... B60T 8/00
180/9.44
9,399,472 B2 * 7/2016 Minoiu-Enache .........
B60W 50/035
(Continued)

FOREIGN PATENT DOCUMENTS

JP 2011-150470 A 8/2011
WO 2012/095716 A1 7/2012
WO 2017/002471 A1 1/2017

OTHER PUBLICATIONS

Communication dated Jul. 23, 2018, from the European Patent Office in counterpart European Application No. 18157773.5.

*Primary Examiner* — Babar Sarwar
(74) *Attorney, Agent, or Firm* — Sughrue Mion, PLLC (57) ABSTRACT

A driving assistance apparatus includes: a driving assistance unit configured to control a braking unit which decelerates a moving body, and assist driving of the moving body by automatic driving; and a switching unit configured to perform instructing a driver of the moving body to operate the braking unit which is under control by the driving assistance unit, and switching from the automatic driving to manual driving by transferring an authority of driving to the driver when receiving an operation of the braking unit by the driver.

12 Claims, 6 Drawing Sheets

(51) Int. Cl.
*B60W 10/20* (2006.01)
*G05D 1/00* (2006.01)
*B60T 8/00* (2006.01)
*B62D 1/28* (2006.01)
*B60T 7/22* (2006.01)
*B60T 7/08* (2006.01)
*B60T 8/17* (2006.01)
*B60W 50/035* (2012.01)
*B60T 7/04* (2006.01)
*B60W 30/06* (2006.01)
*B60W 50/14* (2020.01)
*B60W 50/00* (2006.01)

(52) U.S. Cl.
CPC ................. *B60T 8/00* (2013.01); *B60T 8/17* (2013.01); *B60W 10/18* (2013.01); *B60W 10/20* (2013.01); *B60W 30/06* (2013.01); *B60W 50/035* (2013.01); *B60W 50/14* (2013.01); *B62D 1/286* (2013.01); *G05D 1/0061* (2013.01); *B60T 2201/022* (2013.01); *B60W 2050/007* (2013.01); *B60W 2050/0095* (2013.01); *B60W 2050/146* (2013.01); *B60W 2520/04* (2013.01); *B60W 2540/12* (2013.01); *B60W 2540/18* (2013.01); *B60W 2710/18* (2013.01); *B60W 2710/20* (2013.01); *G05D 2201/0213* (2013.01)

(58) Field of Classification Search
CPC ......... G05D 2201/0213; H04L 5/0007; H04W 52/242; H04W 52/34; H04W 52/365; H04W 72/0413
See application file for complete search history.

(56) References Cited

U.S. PATENT DOCUMENTS

| | | | | |
|---|---|---|---|---|
| 10,093,322 B2* | 10/2018 | Gordon | ............... | B60W 30/095 |
| 2004/0113489 A1* | 6/2004 | Iwagawa | ................ | B60T 7/107 |
| | | | | 303/155 |
| 2008/0064568 A1* | 3/2008 | Kawaguchi | ............. | F16H 61/12 |
| | | | | 477/125 |
| 2008/0167781 A1* | 7/2008 | Labuhn | ................ | B60W 30/08 |
| | | | | 701/48 |
| 2008/0266052 A1* | 10/2008 | Schmid | ............... | G01S 7/52004 |
| | | | | 340/5.1 |
| 2013/0297173 A1* | 11/2013 | Takagi | ................. | G01S 13/862 |
| | | | | 701/70 |
| 2018/0178766 A1* | 6/2018 | Oba | ...................... | B60W 50/10 |

* cited by examiner

DRIVING ASSISTANCE APPARATUS

CROSS REFERENCE TO RELATED APPLICATIONS

This application is based on and claims priority under 35 U.S.C. § 119 to Japanese Patent Application 2017-030148, filed on Feb. 21, 2017, the entire contents of which are incorporated herein by reference.

TECHNICAL FIELD

This disclosure relates to a driving assistance apparatus.

BACKGROUND DISCUSSION

There has been known a driving assistance apparatus, which controls a braking unit, which includes a brake and a brake pedal of a moving body such as a vehicle, and assists driving by automatic driving (including partial automatic driving). The driving assistance apparatus is configured to be switchable between automatic driving and manual driving by a driver. Such a driving assistance apparatus is switched from the automatic driving to the manual driving when a predetermined condition is satisfied by an operation by the driver, or the like. See, for example, JP 2011-150470 A (Reference 1).

However, the driving assistance apparatus described above has a problem in that it is not appropriately switched from the automatic driving to the manual driving.

Thus, a need exists for a driving assistance apparatus which is not susceptible to the drawback mentioned above.

SUMMARY

A driving assistance apparatus according to an aspect of this disclosure includes a driving assistance unit configured to control a braking unit which decelerates a moving body, and assist driving of the moving body by automatic driving, and a switching unit configured to perform instructing a driver of the moving body to operate the braking unit which is under control by the driving assistance unit, and switching from the automatic driving to manual driving by transferring an authority of driving to the driver when receiving an operation of the braking unit by the driver.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, the same reference numerals will be given to the equivalent constituent elements of following exemplary embodiments and the like, and a repeated description thereof will be appropriately omitted.

<Embodiment>

Figure 1:
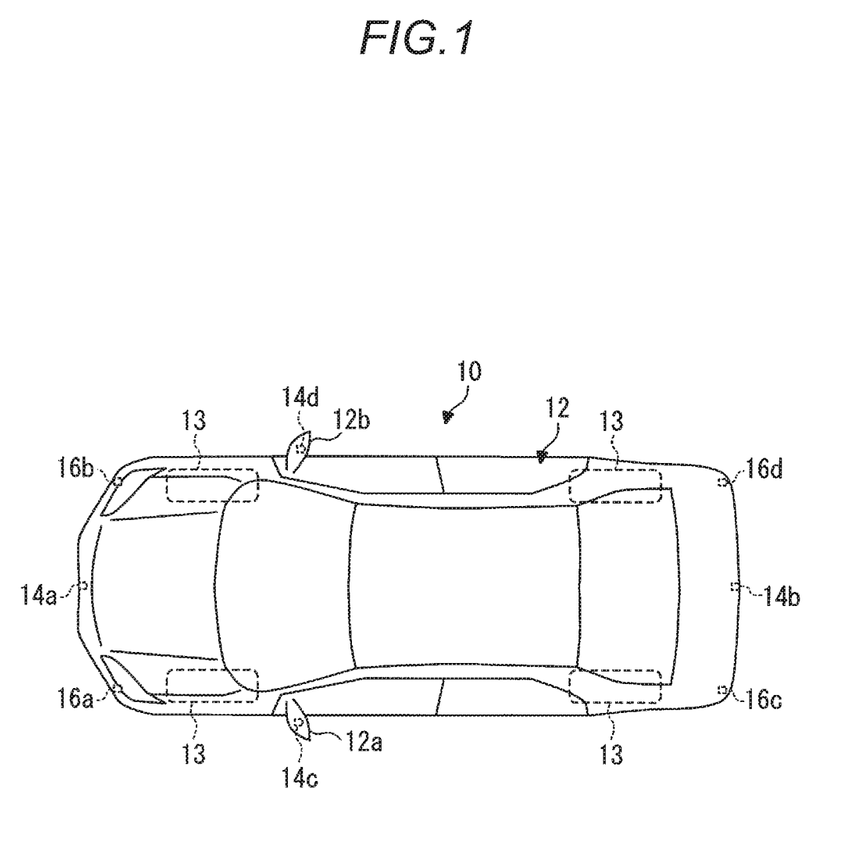
FIG. 1 is a plan view of a vehicle equipped with a parking assistance apparatus according to an embodiment.

FIG. 1 is a plan view of a vehicle 10 equipped with a parking assistance apparatus according to an embodiment. The vehicle 10 is an example of a moving body. As illustrated in FIG. 1, the vehicle 10 includes a vehicle body 12, four wheels 13, one or a plurality of (four in the present embodiment) imaging units 14a, 14b, 14c, and 14d, and one or a plurality of (four in the present embodiment) distance measuring units 16a, 16b, 16c, and 16d. When it is not necessary to distinguish the imaging units 14a, 14b, 14c, and 14d, they will be described as an imaging unit 14. When it is not necessary to distinguish the four distance measuring units 16a, 16b, 16c, and 16d, they will be described as a distance measuring unit 16.

The vehicle body 12 configures a vehicle room in which an occupant rides. The vehicle body 12 accommodates and holds the imaging unit 14 and the like.

The four wheels 13 are provided on the front, rear, left and right of the vehicle body 12. For example, two front wheels 13 function as steered wheels, and two rear wheels 13 function as driving wheels.

The imaging unit 14 is, for example, a digital camera incorporating an imaging element such as a charge coupled device (CCD) or a CMOS Image Sensor (CIS). The imaging unit 14 outputs, as data of a captured image, data of a still image or a moving image including a plurality of frame images generated at a predetermined frame rate. Each imaging unit 14 has a wide-angle lens or a fish-eye lens, and is capable of imaging a range from 140° to 190° in the horizontal direction. The optical axis of the imaging unit 14 is set obliquely downward. Thus, the imaging unit 14 outputs data of a captured image obtained by imaging the surroundings of the vehicle 10 including a surrounding road surface.

The imaging unit 14 is provided around the vehicle body 12. For example, an imaging unit 14a is provided on a center portion (e.g., a front bumper) in the transverse direction of the front end portion of the vehicle body 12. The imaging unit 14a generates a captured image obtained by imaging the surroundings in front of the vehicle 10. An imaging unit 14b is provided on a central portion (e.g., a rear bumper) in the transverse direction of the rear end portion of the vehicle body 12. The imaging unit 14b generates a captured image obtained by imaging the surroundings in rear of the vehicle 10. An imaging unit 14c is provided on a central portion in the longitudinal direction (e.g., a left side view mirror 12a) of a left end portion of the vehicle body 12. The imaging unit 14c generates a captured image obtained by imaging the surroundings on the left of the vehicle 10. An imaging unit 14d is provided on a central portion in the longitudinal direction of a right end portion of the vehicle body 12 (e.g., a right side view mirror 12b). The imaging unit 14d generates a captured image obtained by imaging the surroundings on the right of the vehicle 10.

The distance measuring unit 16 is, for example, sonar that emits ultrasonic waves and grasps the ultrasonic waves reflected by surrounding objects. The distance measuring unit 16 is provided around the vehicle 10, and detects the direction in which an object exists around the vehicle 10 and the distance to the object. The distance measuring unit 16 is provided around the vehicle body 12. For example, the distance measuring units 16a and 16b are provided on the left and right of the front end of the vehicle body 12 (e.g., the left end and the right end of the front bumper). The distance measuring units 16c and 16d are provided on the left and right of the rear end of the vehicle body 12 (e.g., the left end and the right end of the rear bumper).

Figure 2:
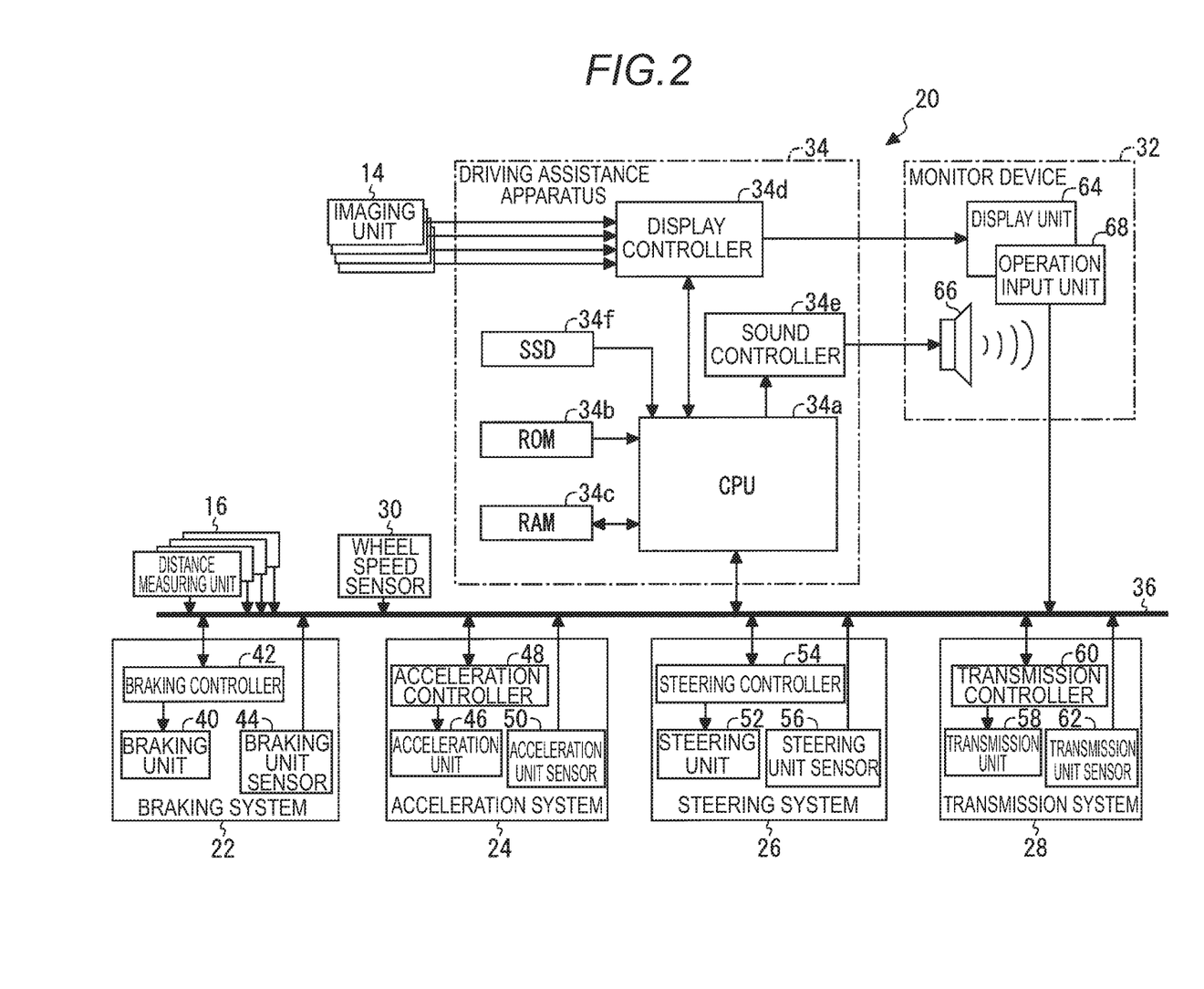
FIG. 2 is a block diagram illustrating an overall configuration of a driving assistance system according to an embodiment.

FIG. 2 is a block diagram illustrating an overall configuration of a driving assistance system 20 according to the embodiment. The driving assistance system 20 is mounted in the vehicle 10, which is an example of a moving body, so as to assist the driving of the vehicle 10 by automatic driving (including partial automatic driving) and so as to control switching between automatic driving and manual driving by a driver.

As illustrated in FIG. 2, the driving assistance system 20 includes the imaging unit 14, the distance measuring unit 16, a braking system 22, an acceleration system 24, a steering system 26, a transmission system 28, a wheel speed sensor 30, a monitor device 32, a driving assistance apparatus 34, and an in-vehicle network 36.

The braking system 22 controls deceleration of the vehicle 10. The braking system 22 includes a braking unit 40, a braking controller 42, and a braking unit sensor 44.

The braking unit 40 includes, for example, a brake, a brake pedal, and the like, and is a device for decelerating the vehicle 10.

The braking controller 42 is, for example, a computer such as a microcomputer having a hardware processor such as a Central Processing Unit (CPU). The brake controller 42 controls the braking unit 40 to control deceleration of the vehicle 10 based on an instruction from the driving assistance apparatus 34.

The braking unit sensor 44 detects a state of the braking unit 40 based on which the driving assistance apparatus 34 determines whether or not the braking unit 40 is operated. The braking unit sensor 44 is, for example, a position sensor, and detects a position of the braking unit 40 or pressure acting on the braking unit 40 when the braking unit 40 is a brake pedal. The braking unit sensor 44 outputs the detected state of the braking unit 40 to the in-vehicle network 36.

The acceleration system 24 controls acceleration of the vehicle 10. The acceleration system 24 includes an acceleration unit 46, an acceleration controller 48, and an acceleration unit sensor 50.

The acceleration unit 46 includes, for example, an accelerator pedal, and the like, and is a device for accelerating the vehicle 10.

The acceleration controller 48 is, for example, a computer such as a microcomputer having a hardware processor such as a Central Processing Unit (CPU). The acceleration controller 48 controls the acceleration unit 46 so as to control the acceleration of the vehicle 10 based on an instruction from the driving assistance apparatus 34.

The acceleration unit sensor 50 detects a state of the acceleration unit 46 based on which the driving assistance apparatus 34 determines whether or not the acceleration unit 46 is operated. The acceleration unit sensor 50 is, for example, a position sensor, and detects a position of the acceleration unit 46 or pressure acting on a movable unit when the acceleration unit 46 is an accelerator pedal. The acceleration unit sensor 50 outputs the detected state of the acceleration unit 46 to the in-vehicle network 36.

The steering system 26 controls a heading direction of the vehicle 10. The steering system 26 includes a steering unit 52, a steering controller 54, and a steering unit sensor 56.

The steering unit 52 includes, for example, a handle, a steering wheel, or the like, and is a device for steering the steered wheels of the vehicle 10.

The steering controller 54 is, for example, a computer such as a microcomputer having a hardware processor such as a Central Processing Unit (CPU). The steering controller 54 controls the steering unit 52 to control the heading direction of the vehicle 10 based on an instruction from the driving assistance apparatus 34.

The steering unit sensor 56 detects a state of the steering unit 52 for allowing the driving assistance apparatus 34 to determine whether or not the steering unit 52 is operated. The steering unit sensor 56 is, for example, an angle sensor including a Hall element, or the like, and detects a rotation angle of the steering unit 52. The steering unit sensor 56 may be, for example, a pressure sensor. When the steering unit 52 is a steering wheel, the steering unit sensor 56 detects pressure acting on the steering unit 52 gripped by the driver. The steering unit sensor 56 outputs the detected state of the steering unit 52 to the in-vehicle network 36.

The transmission system 28 controls the gear ratio of the vehicle 10. The transmission system 28 includes a transmission unit 58, a transmission controller 60, and a transmission unit sensor 62.

The transmission unit 58 includes, for example, a shift lever, and is a device for changing the gear ratio of the vehicle 10.

The transmission controller 60 is a computer such as a microcomputer having a hardware processor such as a Central Processing Unit (CPU). The transmission controller 60 controls the transmission unit 58 to control the gear ratio of the vehicle 10 based on an instruction from the driving assistance apparatus 34.

The transmission unit sensor 62 detects a state of the transmission unit 58 based on which the driving assistance apparatus 34 determines whether or not the transmission unit 58 is operated. The transmission unit sensor 62 is, for example, a pressure sensor. When the transmission unit 58 is a shift lever, the transmission unit sensor 62 detects pressure acting on the transmission unit 58 gripped by the driver. The transmission unit sensor 62 outputs the detected state of the transmission unit 58 to the in-vehicle network 36.

The wheel speed sensor 30 includes, for example, a Hall element provided in the vicinity of the wheel 13 of the vehicle 10, and is a sensor that detects the amount of rotation or revolutions per minute of the wheel 13. The wheel speed sensor 30 outputs, as a sensor value, the number of wheel speed pulses indicating the detected amount of rotation or revolutions per minute to the in-vehicle network 36.

The monitor device 32 is provided on, for example, a dashboard in the room of the vehicle 10. The monitor device 32 includes a display unit 64, a sound output unit 66, and an operation input unit 68.

The display unit 64 displays an image based on image data transmitted by the driving assistance apparatus 34. The display unit 64 is, for example, a display device such as a liquid crystal display (LCD), an organic electroluminescent (EL) display (OLED) or the like. The display unit 64 displays, for example, an image related to an operation instruction for determining switching from automatic driving to manual driving.

The sound output unit 66 outputs sound based on sound data transmitted by the driving assistance apparatus 34. The sound output unit 66 is, for example, a speaker. The sound output unit 66 outputs, for example, sound regarding an operation instruction for determining switching from automatic driving to manual driving.

The operation input unit 68 receives an input from an occupant. The operation input unit 68 is, for example, a touch panel. The operation input unit 68 is provided on a display screen of the display unit 64. The operation input unit 68 is configured to be able to transmit an image displayed by the display unit 64. Thus, the operation input unit 68 may allow the occupant to visually recognize an image displayed on the display screen of the display unit 64. The operation input unit 68 receives an instruction input when the occupant touches a position corresponding to the image displayed on the display screen of the display unit 64, and transmits the instruction to the driving assistance apparatus 34. In addition, the operation input unit 68 is not limited to the touch panel, and may be a hard switch such as a push button.

The driving assistance apparatus 34 is a computer including a microcomputer such as an electronic control unit (ECU). The driving assistance apparatus 34 acquires data of a captured image from the imaging unit 14. The driving assistance apparatus 34 transmits data regarding an image or sound generated based on the captured image or the like to the monitor device 32. The driving assistance apparatus 34 transmits data regarding an image or sound such as an instruction to the driver and a notification to the driver to the monitor device 32. The driving assistance apparatus 34 controls each of the systems 22, 24, 26 and 28 to assist the vehicle 10 so as to perform automatic driving. The driving assistance apparatus 34 includes a central processing unit (CPU) 34a, a read only memory (ROM) 34b, a random access memory (RAM) 34c, a display controller 34d, a sound controller 34e, and a solid state drive (SSD) 34f. The CPU 34a, the ROM 34b, and the RAM 34c may be integrated in the same package.

The CPU 34a is an example of a hardware processor, and reads a program stored in a nonvolatile storage device such as the ROM 34b so as to execute various calculation processings and control based on the corresponding program. For example, the CPU 34a executes an image processing of, for example, a driving assistance image or the like displayed on the display unit 64.

The ROM 34b stores each program, parameters required for executing the program, and the like. The RAM 34c temporarily stores various data used in calculation by the CPU 34a. The display controller 34d mainly executes an image processing of an image obtained by the imaging unit 14, data conversion of a display image to be displayed on the display unit 64, or the like, among the calculation processings by the driving assistance apparatus 34. The sound controller 34e mainly executes a processing of sound to be output by the sound output unit 66, among the calculation processings by the driving assistance apparatus 34. The SSD 34f is a rewritable nonvolatile storage device, and preserves data even when a power supply of the driving assistance apparatus 34 is turned off.

The in-vehicle network 36 are connected to the acceleration system 24, the braking system 22, the steering system 26, the transmission system 28, the distance measuring unit 16, the wheel speed sensor 30, the operation input unit 68 of the monitor device 32, and the driving assistance apparatus 34 so as to transmit and receive information mutually.

Figure 3:
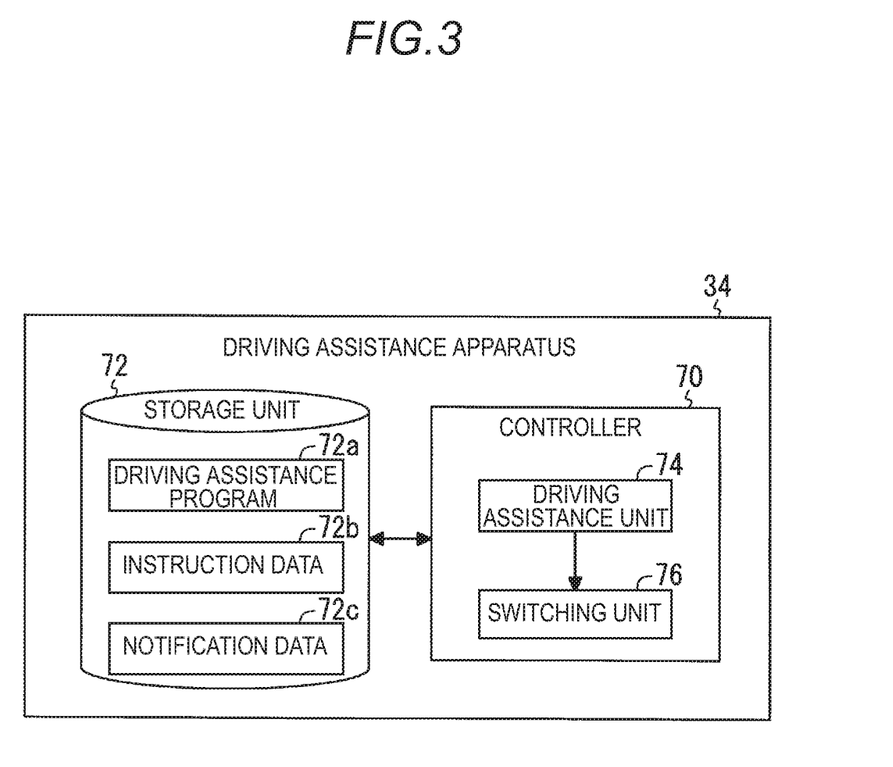
FIG. 3 is a functional block diagram for explaining a function of a driving assistance apparatus.

FIG. 3 is a functional block diagram for explaining a function of the driving assistance apparatus 34. As illustrated in FIG. 3, the driving assistance apparatus 34 includes a controller 70 and a storage unit 72.

The controller 70 is implemented, for example, as a function of the CPU 34a. The controller 70 includes a driving assistance unit 74 and a switching unit 76. The controller 70 functions as the driving assistance unit 74 and the switching unit 76 by reading a driving assistance program 72a stored in the storage unit 72. A part or the entirety of the driving assistance unit 74 and the switching unit 76 may be configured by hardware such as a circuit including application specific integrated circuit (ASIC). A part or the entirety of the driving assistance unit 74 and the switching unit 76 may be provided in any one of the systems 22, 24, 26, and 28. A part or the entirety of the driving assistance unit 74 and the switching unit 76 may be provided in a distributed manner in any one of the systems 22, 24, 26, and 28.

The driving assistance unit 74 controls at least the braking unit 40, the acceleration unit 46, the steering unit 52, and the transmission unit 58 by acquiring a control authority thereof via the braking controller 42, the acceleration controller 48, the steering controller 54, and the transmission controller 60, and assists driving of the vehicle 10 by automatic driving. For example, the driving assistance unit 74 controls the braking unit 40 and assists driving of the vehicle 10 by automatic driving to stop the vehicle 10.

The driving assistance unit 74 assists driving of the vehicle 10 to a target position by automatic driving, and controls the braking unit 40 to stop the vehicle 10 at the target position. The target position is, for example, a parking area, and in this case, driving assistance is parking assistance.

When the vehicle 10 becomes an abnormal state during automatic driving, the driving assistance unit 74 controls the braking unit 40 to stop the vehicle 10 at an appropriate position in the vicinity thereof. An example of the abnormal state is a case where a wheel speed is rapidly increased by the acceleration unit 46 which is under control, a case where a difference between a theoretical value of the wheel speed by the acceleration unit 46 which is under control and the wheel speed which is calculated from and a sensor value of the wheel speed sensor 30 is large, or the like.

When receiving an operation of the steering unit 52 of the vehicle 10 by the driver during automatic driving, the driving assistance unit 74 controls the braking unit 40 to stop the vehicle 10 at an appropriate position in the vicinity thereof. For example, when the driver desires to park the vehicle from a parking area, which is previously set by the driver, to another parking area during parking assistance, the driver operates the steering unit 52.

The switching unit 76 performs switching between automatic driving and manual driving. Specifically, the switching unit 76 instructs the driver to operate the braking unit 40 which is under control of the driving assistance unit 74 during automatic driving. For example, the switching unit 76 instructs to output, by an image or sound, an instruction regarding an operation from the display unit 64 or the sound output unit 66, based on human machine interface (HMI) guidance. When receiving at least an operation of the braking unit 40 by the driver of the vehicle 10, the switching unit 76 delegates a driving authority to the driver. Thus, the switching unit 76 performs switching from automatic driving to manual driving.

For example, when receiving an operation of the braking unit 40 by the driver in a state where the braking unit 40 is controlled such that the vehicle 10 is stopped at a target position such as a parking area, the switching unit 76 transfers a driving authority to the driver to perform switching to manual driving.

When receiving an operation of the braking unit 40 by the driver in a state where the vehicle 10 becomes an abnormal state and the braking unit 40 is controlled so that the vehicle 10 stops, the switching unit 76 transfers a driving authority to the driver to perform switching to manual driving.

When receiving a switching operation to manual driving after receiving an operation of the braking unit 40 by the driver in a state where the steering unit 52 is operated and the braking unit 40 is controlled such that the vehicle 10 is stopped, the switching unit 76 transfers a driving authority to the driver to perform switching to manual driving. An example of the switching operation is cancel of an operation of the braking unit 40. In addition, when receiving a return operation to automatic driving and the above-described switching operation after receiving an operation of the braking unit 40 by the driver in a state where the vehicle 10 operated by the steering unit 52 is stopped, the switching unit 76 performs return to automatic driving. An example of the return operation is to touch the operation input unit 68 on a return button displayed on the display unit 64.

The storage unit 72 is implemented as a function of at least one of the ROM 34b, the RAM 34c, and the SSD 34f. The storage unit 72 stores data such as a driving assistance program 72a executed by the controller 70, instruction data 72b and notification data 72c required to execute the driving assistance program 72a, and the like. The instruction data 72b is data regarding an instruction to cause the driver to operate the braking unit 40, and includes image data, sound data, or the like. The notification data 72c is data for notifying the driver of switching and includes image data, sound data, or the like.

Figure 4:
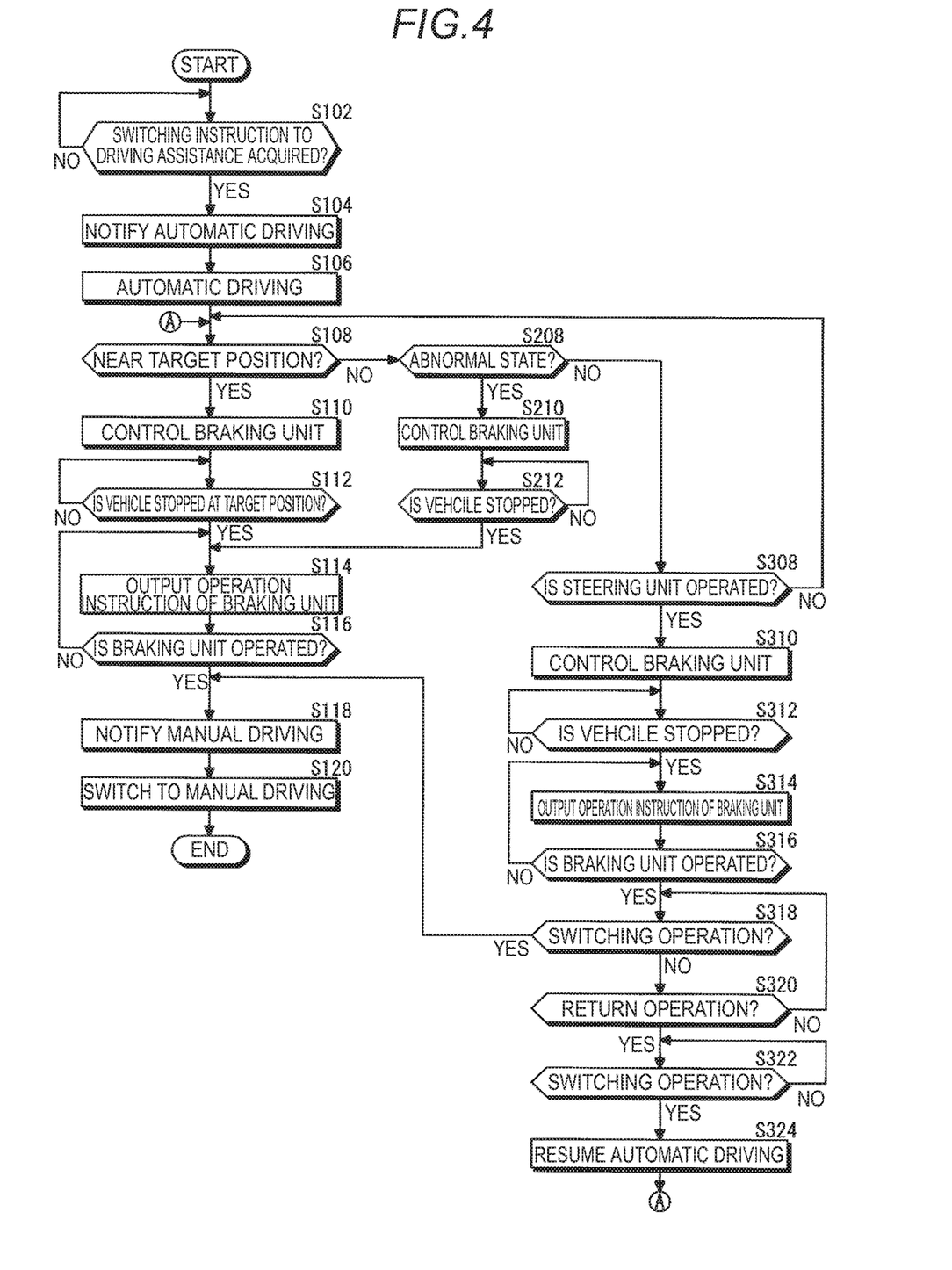
FIG. 4 is a flowchart of a driving assistance processing executed by a controller of the driving assistance apparatus.

FIG. 4 is a flowchart of a driving assistance processing executed by the controller 70 of the driving assistance apparatus 34. The controller 70 executes a driving assistance processing depending on reading of the driving assistance program 72a stored in the storage unit 72.

As illustrated in FIG. 4, the driving assistance apparatus 34 determines whether or not the driving assistance unit 74 acquires an instruction of driving assistance by automatic driving to a target position set based on information from the imaging unit 14 and the distance measuring unit 16 from the driver during manual driving by the driver (S102). An example of driving assistance is parking assistance for parking the vehicle 10 in a parking area, which is an example of the target position. For example, in a state where a driving assistance instruction button, which instructs driving assistance, is displayed on the display unit 64, when the driver touches the driving assistance instruction button on the display unit 64, the driving assistance unit 74 may determine that the instruction of driving assistance is acquired from the driver. In addition, in a state where a parking area is displayed together with an image of the surroundings of the vehicle 10 on the display unit 64, when the driver touches the parking area on the display unit 64, the driving assistance unit 74 may determine that the instruction of driving assistance is acquired from the driver. The driving assistance unit 74 is in a standby state while continuing manual driving until the instruction of driving assistance is acquired (S102: No). When acquiring the instruction of driving assistance (S102: Yes), the driving assistance unit 74 notifies the driver of the beginning of automatic driving by outputting an image or sound via the display unit 64 or the sound output unit 66 (S104). The driving assistance unit 74 assists automatic driving of the vehicle 10 by controlling at least one of the acceleration unit 46, the braking unit 40, the steering unit 52, and the transmission unit 58 (S106).

The driving assistance unit 74 determines whether or not the vehicle has reached the vicinity of the target position such as the parking area (S108). When it is determined that the vehicle has reached the vicinity of the target position (S108: Yes), the driving assistance unit 74 controls the braking unit 40 to decelerate the vehicle 10 (S110). The driving assistance unit 74 determines whether or not the vehicle 10 is stopped at the target position based on the information and the like acquired from the imaging unit 14, the distance measuring unit 16, and the wheel speed sensor 30 (S112). The driving assistance unit 74 is in a standby state while continuing the control of the braking unit 40 until it is determined that the vehicle 10 is stopped at the target position (S112: No). When it is determined that the vehicle 10 is stopped at the target position (S112: Yes), the driving assistance unit 74 outputs a switching determination instruction to the switching unit 76 while continuing the control of the braking unit 40.

Figure 5:
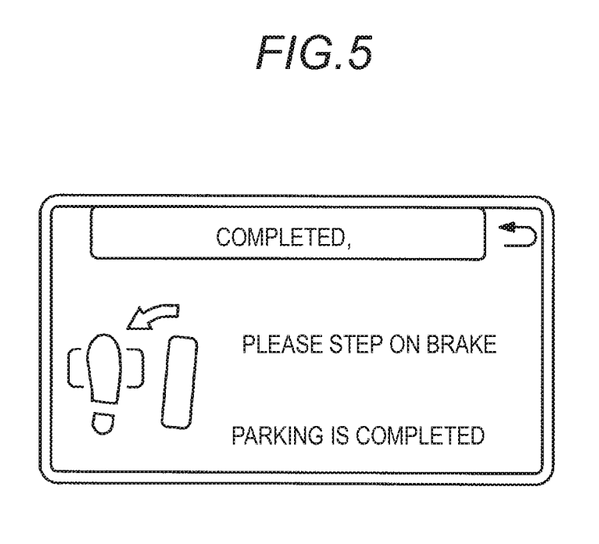
FIG. 5 is a view illustrating an exemplary image of an operation instruction.

When acquiring the switching determination instruction, the switching unit 76 outputs an operation instruction of the braking unit 40 (S114). FIG. 5 is an exemplary image of an operation instruction. For example, the switching unit 76 outputs an operation instruction of the braking unit 40 to the driver by causing the display unit 64 to display an image of the operation instruction of the braking unit 40 as illustrated in FIG. 5 based on the instruction data 72b.

The switching unit 76 determines whether or not the driver operates the braking unit 40, which is an operation object of the operation instruction (S116). The switching unit 76 may, for example, determine whether or not the braking unit 40 is operated based on a state of the braking unit 40 such as a position of the braking unit 40 or pressure acting on the braking unit 40 acquired from the braking unit sensor 44. Specifically, when the position of the braking unit 40 received from the braking unit sensor 44 becomes a position, which is more depressed than the position of the braking unit 40 at the time of outputting the operation instruction of the braking unit 40, the switching unit 76 may determine that the braking unit 40 is operated by the driver.

When it is determined that the driver does not operate the braking unit 40 (S116: No), the switching unit 76 outputs again the operation instruction of the braking unit 40 (S114). In addition, in the case where the operation instruction is output again, when the operation instruction is sound, the switching unit 76 may repeat the operation instruction, and when the operation instruction is an image, the switching unit 76 may blink the image.

Figure 6:
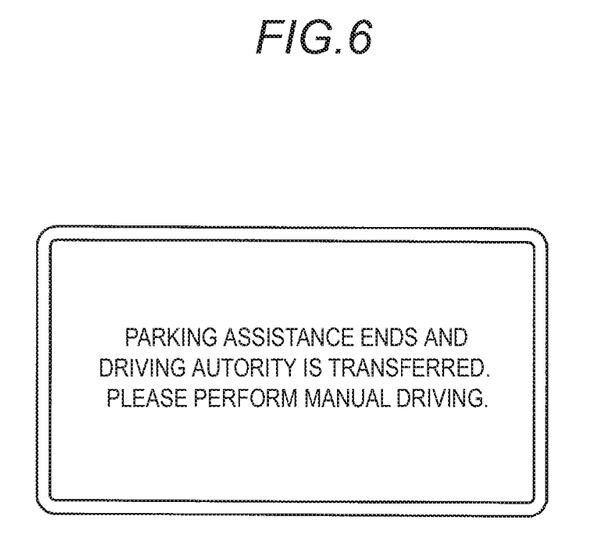
FIG. 6 is a view illustrating an exemplary image of a switching notification.

When it is determined that the driver operates the braking unit 40 (S116: Yes), the switching unit 76 notifies the driver of switching to manual driving by an image or sound (S118). FIG. 6 is an exemplary image of a switching notification. For example, the switching unit 76 notifies the driver of switching to manual driving by causing the display unit 64 to display an image of a switching notification for switching to manual driving by transferring an authority as illustrated in FIG. 6 based on the notification data 72c. The switching unit 76 stops the control of the acceleration unit 46, the braking unit 40, the steering unit 52, and the transmission unit 58 by the driving assistance unit 74, and transfers a driving authority to the driver so as to perform switching from automatic driving to manual driving (S120). Thus, the controller 70 terminates the driving assistance processing.

Meanwhile, in step S108, when it is determined that the vehicle 10 is not in the vicinity of the target position (S108: No), the driving assistance unit 74 determines whether or not the vehicle 10 is abnormal during automatic driving (S208). For example, the driving assistance unit 74 determines that the acceleration unit 46 or the like, which is a control object, is abnormal when the wheel speed calculated from the sensor value of the wheel speed sensor 30 is rapidly increased, when a difference between the theoretical value based on the control of the acceleration unit 46 and the calculated wheel speed is large, or the like.

When it is determined that the vehicle 10 is abnormal during the automatic driving without reaching the vicinity of the target position (S208: Yes), the driving assistance unit 74 controls the braking unit 40 (S210) to decelerate the vehicle 10 and stop the vehicle 10 at a position in the vicinity thereof. The driving assistance unit 74 maintains the deceleration state until it is determined that the vehicle 10 is stopped (S212: No). When it is determined that the vehicle 10 is stopped (S212: Yes), the driving assistance unit 74 executes the processings after step S114.

Meanwhile, in step S208, when it is determined that the vehicle 10 is not abnormal (S208: No), the driving assistance unit 74 determines whether or not the driver operates the steering unit 52 (S308). For example, in automatic driving during parking assistance, the driver operates the steering unit 52 when it is desired to park the vehicle from a previously set parking area to another parking area. For example, the driving assistance unit 74 may acquire a state of the steering unit 52 from the steering unit sensor 56, and may determine whether or not the steering unit 52 is operated based on a change in the rotation angle of the steering unit 52, a change in the pressure acting on the steering unit 52, or the like. When it is determined that the driver does not operate the steering unit 52 (S308: No), the driving assistance unit 74 continues automatic driving and repeats the processings after step S108.

When the steering unit 52 is operated by the driver in a state where the vehicle is not in the vicinity of the target position and an abnormal state is not detected (S308: Yes), the driving assistance unit 74 controls the braking unit 40 to decelerate the vehicle 10 (S310). The driving assistance unit 74 determines whether or not the vehicle 10 is stopped until the vehicle 10 is stopped (S312: No). When the vehicle 10 is stopped (S312: Yes), the driving assistance unit 74 outputs a switching determination instruction to the switching unit 76 while continuing the control of the braking unit 40.

When acquiring the switching determination instruction, the switching unit 76 outputs an operation instruction of the braking unit 40 by the display unit 64 or the sound output unit 66 (S314). The switching unit 76 repeats the processings after step S314 until the braking unit 40 is operated (S316: No). When the braking unit 40 is operated (S316: Yes), the switching unit 76 determines whether or not a switching operation for resuming driving by automatic driving or manual driving is acquired (S318). An example of a switching operation is that the driver cancels an operation of the braking unit 40. For example, when the driver cancels the operation of the braking unit 40 and when it is determined that the switching operation is acquired (S318: Yes), the switching unit 76 executes the processings after step S118, and transfers a driving authority to the driver to perform switching to manual driving.

When the switching operation is not acquired (S318: No), the switching unit 76 determines whether or not a return operation has been acquired (S320). For example, in a case of parking assistance, the return operation is an operation of the driver touching the return button displayed on the display unit 64. For example, in a case of parking assistance, the return operation may be an operation of the driver touching a parking area displayed on the display unit 64. When the return operation is not acquired (S320: No), the switching unit 76 repeats the processings after step S318.

When the return operation is acquired (S320: Yes), the switching unit 76 determines whether or not a switching operation is acquired (S322). The switching operation in step S322 may be cancel of an operation of the braking unit 40, in the same manner as the switching operation in step S318. The switching unit 76 is in a standby state until the switching operation is acquired (S322: No). When it is determined that the switching operation is acquired (S322: Yes), the switching unit 76 outputs a resumption instruction to the driving assistance unit 74. Thus, the driving assistance unit 74 resumes automatic driving (S324) to repeat the processings after step S108.

Figure 7:
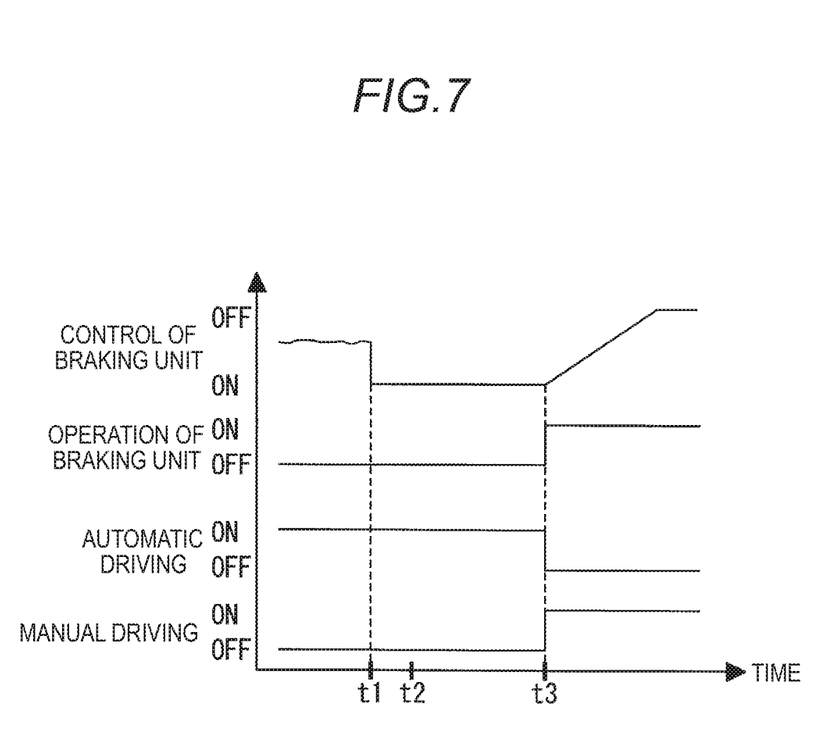
FIG. 7 is a graph illustrating a timing chart of the driving assistance processing when a target position has been reached.

FIG. 7 is a graph illustrating a timing chart of the driving assistance processing when the target position is reached. The timing chart at the uppermost stage of FIG. 7 illustrates the control of the braking unit 40 by the driving assistance unit 74. The timing chart at the second stage from the top illustrates the operation of the braking unit 40 by the driver. The timing chart at the second stage from the bottom illustrates ON/OFF of automatic driving by the driving assistance unit 74. The timing chart at the lowermost stage illustrates ON/OFF of manual driving by the driver.

As illustrated in FIG. 7, the driving assistance unit 74 moves the vehicle 10 to the target position at time t1, and causes the braking unit 40 to output a maximum braking force so as to stop the vehicle 10. The switching unit 76 outputs an image of an operation instruction (see FIG. 5) at time t2 after time t1. When the driver operates the braking unit 40 at time t3 in response to the operation instruction, the driving assistance unit 74 cancels the control of the braking unit 40 to terminate automatic driving, and also displays an image for the delegation of an authority (see FIG. 6) to perform switching to manual driving.

As described above, when the switching unit 76 instructs the operation of the braking unit 40, which is controlled by the driving assistance unit 74, during automatic driving so that the braking unit 40 is operated by the driver, the driving assistance apparatus 34 switches the vehicle 10 to manual driving. In this way, the driving assistance apparatus 34 may suppress a sudden change in the state of the vehicle 10 when switching because it switches the vehicle to manual driving while continuing braking by the braking unit 40. Thus, the driving assistance apparatus 34 may appropriately perform switching from automatic driving to manual driving.

For example, in automatic driving for parking assistance, when the driver operates the braking unit 40 in a state where the driving assistance unit 74 controls the braking unit 40 to stop the vehicle at a parking area, which is a target position, the driving assistance apparatus 34 performs switching from automatic driving to manual driving. Thus, the driving assistance apparatus 34 may suppress traveling of the stopped vehicle 10 when switching to manual driving.

When the driver operates the braking unit 40 in a state where an abnormal state occurs during automatic driving and the driving assistance unit 74 controls the braking unit 40 to stop the vehicle 10, the driving assistance apparatus 34 performs switching from automatic driving to manual driving. Thus, the driving assistance apparatus 34 may suppress traveling of the stopped vehicle 10 due to an abnormal state when switching to manual driving.

In the driving assistance apparatus 34, when the driver controls the steering unit 52 during automatic driving, the driving assistance unit 74 controls the braking unit 40 to stop the vehicle 10. In this state, when the driver operates the braking unit 40, the driving assistance apparatus 34 performs switching from automatic driving to manual driving. Thus, the driving assistance apparatus 34 may suppress traveling of the stopped vehicle 10 by an operation of the steering section 52 of the driver when switching to manual driving.

In addition, the driving assistance apparatus 34 resumes automatic driving when the driver performs a return operation of operating the return button displayed on the display unit 64 and then performs a switching operation of canceling the operation of the braking unit 40 after operating the braking unit 40 in a state where the vehicle 10 is stopped by the control of the steering unit 52 by the driver. Thus, the driving assistance apparatus 34 may resume automatic driving even when the steering unit 52 is erroneously operated by the driver.

The function, connection relationship, number, arrangement, and the like of the configurations of respective embodiments described above may be appropriately changed, deleted, and so on within the scope of the embodiments disclosed here and the scope equivalent to the scope of the embodiments disclosed here. Respective embodiments may be appropriately combined with each other. The order of respective steps of each embodiment may be appropriately changed.

For example, in the above-described embodiments, the vehicle 10 has been described as an example of the moving body, but the moving body is not limited to the vehicle 10. For example, the moving body may be a ship, an airplane, a two-wheeled vehicle, or the like.

In the above-described embodiments, although the driving assistance unit 74 determines whether or not the braking unit 40 is operated in step S116, the switching unit 76 may determine switching to manual driving depending on whether or not the acceleration unit 46 or the like is operated with the braking unit 40 during automatic driving on a highway or the like. In this case, when receiving an operation of the acceleration unit 46, the switching unit 76 may transfer a driving authority of the vehicle 10 during automatic driving to the driver so as to perform switching to manual driving.

In the embodiments described above, parking assistance has been described by way of example, but driving assistance is not limited to parking assistance. For example, driving assistance may be driving assistance for preventing a collision with another vehicle, or driving assistance to a target position at a remote distance.

A driving assistance apparatus according to an aspect of this disclosure includes a driving assistance unit configured to control a braking unit which decelerates a moving body, and assist driving of the moving body by automatic driving, and a switching unit configured to perform instructing a driver of the moving body to operate the braking unit which is under control by the driving assistance unit, and switching from the automatic driving to manual driving by transferring an authority of driving to the driver when receiving an operation of the braking unit by the driver.

Thus, according to the aspect of this disclosure, switching from the automatic driving to the manual driving is performed while continuing braking by the braking unit by causing the driver to operate the braking unit, which is under control. Thus, according to this disclosure, it is possible to appropriately perform switching from automatic driving to manual driving by suppressing a sudden change in the state of a vehicle when switching (e.g., from stop to traveling).

In the driving assistance apparatus according to the aspect of this disclosure, the driving assistance unit may assist the driving of the moving body to a target position by the automatic driving, and control the braking unit to stop the moving body, and the switching unit may transfer the authority of driving to the driver when receiving the operation of the braking unit by the driver in a state where the moving body is stopped With this configuration, it is possible to suppress traveling of the vehicle which is stopped at the target position when performing switching from automatic driving to manual driving.

In the driving assistance apparatus according to the aspect of this disclosure, the driving assistance unit may control the braking unit to stop the moving body when the moving body becomes an abnormal state during the automatic driving, and the switching unit may transfer the authority of driving to the driver when receiving the operation of the braking unit by the driver in a state where the moving body is stopped.

With this configuration, it is possible to suppress traveling of the vehicle which is stopped in an abnormal state, when performing switching from automatic driving to manual driving.

In the driving assistance apparatus according to the aspect of this disclosure, the driving assistance unit may control the braking unit to stop the moving body when receiving an operation of a steering unit, which steers the moving body during the automatic driving, and the switching unit may transfer the authority of driving to the driver when receiving a switching operation to the manual driving after receiving the operation of the braking unit by the driver in a state where the moving body is stopped.

With this configuration, it is possible to suppress traveling of the vehicle which is stopped by the operation of the steering unit, when performing switching from automatic driving to manual driving.

In the driving assistance apparatus according to the aspect of this disclosure, the switching unit may output an resumption instruction of the automatic driving to the driving assistance unit when receiving a return operation to the automatic driving and then receiving the switching operation after receiving the operation of the braking unit by the driver in a state where the moving body is stopped.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A driving assistance apparatus comprising:
a driving assistance unit configured to control a braking unit which decelerates a moving body, and assist driving of the moving body by automatic driving; and
a switching unit configured to perform instructing a driver of the moving body to operate the braking unit which is under control by the driving assistance unit, and switching from the automatic driving to manual driving by transferring an authority of driving to the driver when receiving an operation of the braking unit by the driver;

wherein the driving assistance unit assists the driving of the moving body to a target position by the automatic driving, and controls the braking unit to stop the moving body, and in a state where it is determined that the moving body is stopped and the braking unit is operated by the driver, the switching unit transfers the authority of driving from automatic driving controlled by the driving assistance unit to manual driving by the driver;

the transfer of authority of driving from automatic driving to manual driving comprises ending the automatic driving.

2. The driving assistance apparatus according to claim 1, wherein the driving assistance unit controls the braking unit to stop the moving body when the moving body becomes an abnormal state during the automatic driving, and the switching unit transfers the authority of driving to the driver when receiving the operation of the braking unit by the driver in a state where the moving body is stopped.

3. The driving assistance apparatus according to claim 2, wherein the driving assistance unit controls the braking unit to stop the moving body when receiving an operation of a steering unit which steers the moving body during the automatic driving, and the switching unit transfers the authority of driving to the driver when receiving a switching operation to the manual driving after receiving the operation of the braking unit by the driver in a state where the moving body is stopped.

4. The driving assistance apparatus according to claim 3, wherein the switching unit outputs a resumption instruction of the automatic driving to the driving assistance unit when receiving a return operation to the automatic driving and then receiving the switching operation after receiving the operation of the braking unit by the driver in a state where the moving body is stopped.

5. The driving assistance apparatus according to claim 1, wherein the driving assistance unit controls the braking unit to stop the moving body when the moving body becomes an abnormal state during the automatic driving, and the switching unit transfers the authority of driving to the driver when receiving the operation of the braking unit by the driver in a state where the moving body is stopped.

6. The driving assistance apparatus according to claim 5, wherein the driving assistance unit controls the braking unit to stop the moving body when receiving an operation of a steering unit which steers the moving body during the automatic driving, and the switching unit transfers the authority of driving to the driver when receiving a switching operation to the manual driving after receiving the operation of the braking unit by the driver in a state where the moving body is stopped.

7. The driving assistance apparatus according to claim 6, wherein the switching unit outputs a resumption instruction of the automatic driving to the driving assistance unit when receiving a return operation to the automatic driving and then receiving the switching operation after receiving the operation of the braking unit by the driver in a state where the moving body is stopped.

8. The driving assistance apparatus according to claim 1, wherein the driving assistance unit controls the braking unit to stop the moving body when receiving an operation of a steering unit which steers the moving body during the automatic driving, and the switching unit transfers the authority of driving to the driver when receiving a switching operation to the manual driving after receiving the operation of the braking unit by the driver in a state where the moving body is stopped.

9. The driving assistance apparatus according to claim 8, wherein the switching unit outputs a resumption instruction of the automatic driving to the driving assistance unit when receiving a return operation to the automatic driving and then receiving the switching operation after receiving the operation of the braking unit by the driver in a state where the moving body is stopped.

10. The driving assistance apparatus according to claim 1, wherein the driving assistance unit controls the braking unit to stop the moving body when receiving an operation of a steering unit which steers the moving body during the automatic driving, and the switching unit transfers the authority of driving to the driver when receiving a switching operation to the manual driving after receiving the operation of the braking unit by the driver in a state where the moving body is stopped.

11. The driving assistance apparatus according to claim 10, wherein the switching unit outputs a resumption instruction of the automatic driving to the driving assistance unit when receiving a return operation to the automatic driving and then receiving the switching operation after receiving the operation of the braking unit by the driver in a state where the moving body is stopped.

12. The driving assistance apparatus according to claim 10, wherein in a state where it is determined that the moving body is stopped and the braking unit is operated by the driver, the switching unit notifies the driver of ending the automatic driving and switching to manual driving by an image or a sound.

* * * * *